Patented June 27, 1939

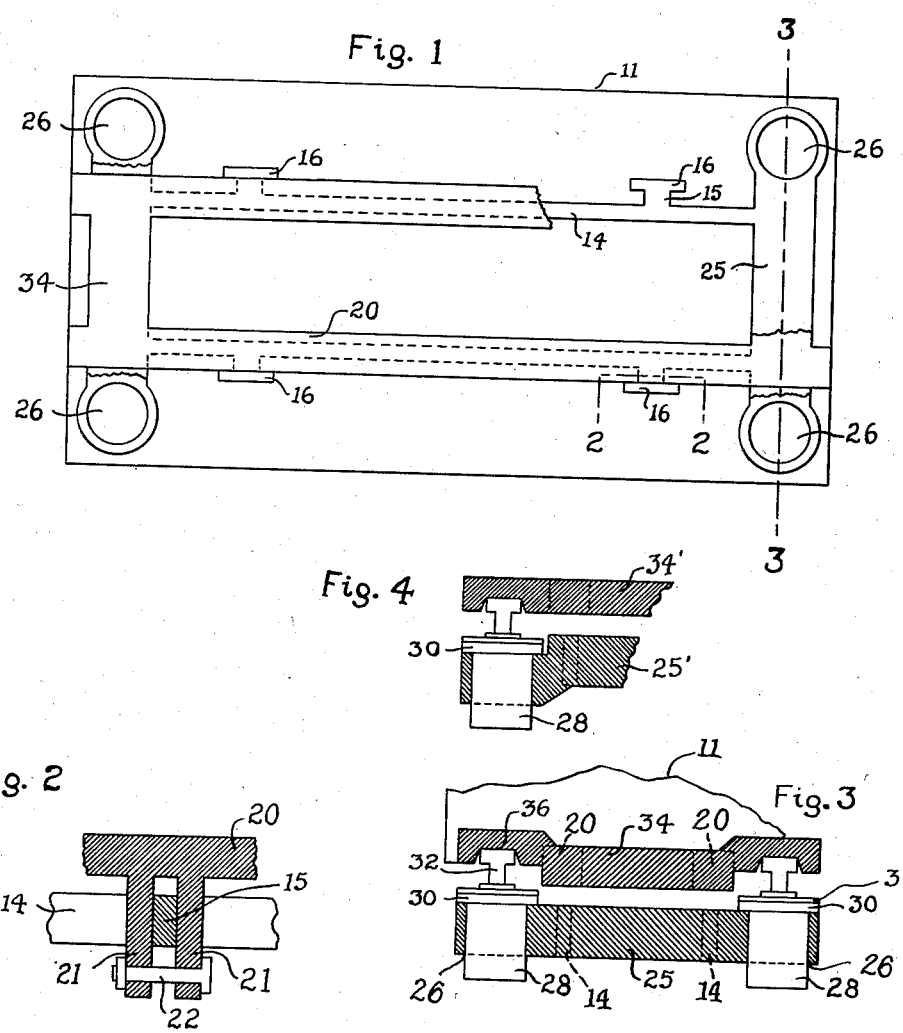

2,164,068

UNITED STATES PATENT OFFICE 2,164,068

PNEUMATIC SPRING SUSPENSION MEANS

Julian E. Johnson, Chicago, Ill.

Application November 13, 1936, Serial No. 110,708

8 Claims. (Cl. 296—35)

This invention relates to pneumatic spring suspension means, particularly adapted for use on motor driven vehicles such as motor coaches.

While I do not wish to limit myself to any one type of spring, reference may be had to my Patent No. 1,937,896, issued December 5, 1933, and to my co-pending application Serial No. 101,767, filed September 21, 1936.

A primary object of this invention is to provide an improved pneumatic spring suspension means.

Another object is to provide improved suspension means whereby the entire weight of the vehicle body is given resilient support by the pneumatic springs, thereby distinguishing from suspensions whereby the vehicle body rests partly on leaf springs and partly on pneumatic springs associated with the leaf springs.

A further object is to provide a pneumatic spring suspension means such that the vehicle body is pneumatically insulated against motor vibrations as well as road shocks.

Still another object is to provide suspension means such that the vehicle body can have only vertical movement with respect to the chassis, with pneumatic spring means interposed between the body and the chassis and providing resilient support to the body.

A further object is to provide suspension means such that the vehicle body rests on the pneumatic springs when they are inflated, the vehicle body resting on means other than the pneumatic springs should they become deflated.

These and other objects are attained by this invention, as will be apparent from the following description and the accompanying drawing, in which, Fig. 1 is a plan view, showing my pneumatic spring suspension means;

Fig. 2 is a partial vertical sectional view, taken on line 2—2 of Fig. 1;

Fig. 3 is a vertical sectional view, taken on line 3—3 of Fig. 1; and

Fig. 4 is a partial sectional view, taken on the same plane as Fig. 3, and showing alternative construction.

In the drawing, 11 represents the outline of the vehicle body. The chassis frame 14 may be supported by the usual leaf springs, with any conventional arrangement of motor and running gear.

Figs. 1 and 2 show guide means adapted to hold body frame 20 to its desired position over chassis frame 14, said guide means preventing horizontal movement of frame 20 with respect to frame 14. Projections 15, with their heads 16, extend laterally from frame 14 preferably at four positions as shown in Fig. 1. Body frame 20 is provided with downward projections or jaws 21, embracing each of the four projections 15 of chassis frame 14, thus enabling vertical movement only between frames 20 and 14. When the body leans slightly forward or backward a possible tendency for jaws 21 to stick or jam against projections 15 may be prevented by having jaws 21 fit somewhat loosely around projections 15. Or the bearing surfaces of projections 15 may be somewhat convex instead of flat, thereby allowing frame 20 and its jaws 21 to turn slightly on projections 15 without sticking or jamming. The upward movement of frame 20 away from frame 14 is limited by retaining piece 22. This vertical guide means is shown particularly in Fig. 2, although in Fig. 1 a portion of frame 20 is cut away to better show one of the projections 15 of frame 14.

Chassis frame 14 has cross portions 25 at the front and the rear end of the vehicle. Said cross portions 25 have annular openings 26 adapted to receive pneumatic springs 28, the said springs having a raised portion 30 extending around the upper level of the cylinders and adapted to rest on the upper rim of the openings 26, thereby limiting the downward movement of the spring cylinders through openings 26. Pneumatic springs, preferably four in number, are thus supported by cross portions 25 of chassis frame 14, with one pneumatic spring at or near each corner of the vehicle. This type of pneumatic spring, which is described more fully in my above referred to application, includes a cylinder having a cover 31 suitably attached, a piston slidable in the cylinder, and a piston stem 32 terminating in a load rest adapted to engage a recess 36 under the body to be supported (Fig. 3).

Body frame 20 has cross portions 34 at the front and the rear ends of the vehicle, corresponding to the cross portions 25 of frame 14. The under surfaces of cross portions 34 are provided with the recesses 36 adapted to engage the tops of stems 32 of the pneumatic springs 28, thereby providing frame 20 and the vehicle body with resilient support from pneumatic springs which are mounted on the chassis frame 14.

In Fig. 3, cross portion 25 is straight, while cross portion 34 extends upward over the spring stems 32. Fig. 4 shows an alternative construction in which cross portion 34' is straight, with cross portion 25' extending downward to provide suitable spring space between cross portions 25' and 34'. The construction shown in Fig. 4 may be preferable on some vehicles.

Chassis and body frames are so designed as to be better able to resist vertical stresses than torsional or twisting stresses. The springs 28 apply their supporting force within the central vertical planes of portions 25 and 34, and therefore avoid the imposition of torsional stresses on the chassis and body members. This suspension mean may be distinguished from spring suspensions in which the springs are attached to the sides of chassis or body members so as to impose torsional stresses.

The expression "longitudinal central axis" denotes an imaginary line drawn horizontally through the center of the vehicle from front to rear. It is about this axis that roll of the vehicle from side to side may be assumed to occur. The closer the pneumatic springs are placed to this axis, the greater is the degree of side roll which may occur from a given deflection of the pneumatic springs. By placing the springs 28 near the ends of cross portions 25 and 34, as close as feasible to the sides of the vehicle body, a maximum degree of stability on curves is obtained.

On conventional automotive vehicles, the chassis frame is only about one-half as wide as the vehicle body. This means, in terms of Fig. 1, that chassis member 14 is approximately midway between the side 11 of the vehicle and the longitudinal central axis of the vehicle. Pneumatic springs mounted in the plane of chassis member 14 would therefore permit twice the degree of side roll of the vehicle for a given spring deflection as would be the case if the springs were mounted in the plane of the vehicle's side wall 11. And a given tendency to side roll of the vehicle would exert twice the leverage and therefore twice the downward pressure on springs mounted in the plane of the side wall 11 of the vehicle. This shows the importance of cross members 25 and 34 in providing a suitable means of pneumatic spring suspension for vehicles.

Cross portions 25 and 34 may serve also as cross braces for frames 14 and 20 respectively.

In Fig. 1, to avoid excessive detail, the pneumatic springs are not shown in the openings 26, nor are the cross portions 34 of frame 20. Fig. 3 contains details omitted from Fig. 1.

While Fig. 3 was described as being on line 3—3 of Fig. 1, it should be understood that the opposite end of the vehicle has substantially the same provisions as those shown in Fig. 3.

I claim:

1. Pneumatic spring means, a vehicle having an undercarriage and a body thereon, guide means associated with said vehicle and including a plurality of suitably placed projections extending laterally from said undercarriage and projections or jaws extending downward from said body and adapted to embrace the said lateral projections so as to provide for vertical relative movement only between said body and undercarriage, and means for interposing said pneumatic spring means between said body and undercarriage so that said body is wholly supported by said pneumatic spring means.

2. Pneumatic spring means, a vehicle having an undercarriage and a body thereon, guide means associated with said vehicle and including a plurality of suitably placed projections extending laterally from said undercarriage and projections or jaws extending downward in pairs from said body and adapted to embrace the said lateral projections so as to provide for vertical relative movement only between said body and undercarriage, means for limiting the extent of said vertical movement and comprising a bar fixed across the lower ends of each pair of the said downward projections thereby retaining the body in its position on the undercarriage, and means for interposing said pneumatic spring means between said body and undercarriage so that said body is resiliently supported by said pneumatic spring means.

3. Pneumatic spring means including cylinder means, piston means slidable therein, and compressed air chamber means within said cylinder means and adapted to give resilient support to a load, a vehicle having an undercarriage and a body thereon, guide means associated with said vehicle and including a plurality of suitably placed projections extending laterally from said undercarriage and projections or jaws extending downward in pairs from said body, each of said pairs of downward projections being adapted to embrace one of the said lateral projections so as to provide for vertical relative movement only between said body and undercarriage, and additional means associated with said vehicle whereby said pneumatic spring means is interposed between said body and undercarriage so that said body is resiliently supported by said pneumatic spring means.

4. Pneumatic spring means, a vehicle having an undercarriage and a body thereon, guide means associated with said vehicle and including a plurality of suitably placed projections extending laterally from said undercarriage and projections or jaws extending downward from said body and adapted to engage the said lateral projections so as to provide for vertical relative movement only between said body and undercarriage, and additional means associated with said vehicle whereby said pneumatic spring means is interposed between said body and undercarriage, said spring means being adapted when inflated to give resilient support to said body and said body being adapted to rest directly upon said undercarriage and not upon said spring means should the said spring means become deflated.

5. Pneumatic spring means comprising a plurality of pneumatic springs having cylinder means and piston means slidable therein, a vehicle having a chassis and a body thereon, guide means associated with said vehicle and adapted to provide for vertical relative movement only between said chassis and body, a cross member associated with said chassis near its front end and extending substantially beyond said chassis toward either side of said vehicle body, a similar cross member associated with said chassis near the rear of said vehicle, each of said cross members having means located near its ends and adapted to provide a support or base for said pneumatic spring means, and means for resiliently supporting said body upon said pneumatic spring means.

6. Pneumatic spring means comprising a plurality of pneumatic springs including cylinder means and piston means slidable therein, a vehicle including a chassis and a body thereon, said chassis being substantially narrower than said body, cross members associated with said chassis near its front and rear ends and extending beyond the sides of said chassis approximately to the sides of said vehicle body, means associated with said cross members and adapted to support one of said pneumatic springs at either end of each cross member, and means whereby said body is resiliently supported on said pneumatic spring means.

7. Pneumatic spring means including cylinder means and piston means slidable therein, a vehicle including a chassis and a body thereon, said chassis being substantially narrower than said body, cross members associated with the front and rear ends of said chassis and extending beyond said chassis toward the sides of said body, means for mounting pneumatic spring means at the ends of said cross members thereby widening the spring base and reducing the vehicle's tendency to side roll in rounding curves, and means for resiliently supporting said body on said pneumatic spring means.

8. Pneumatic spring means comprising a plurality of pneumatic springs having cylinder means with piston means slidable therein, a vehicle having a chassis and a body thereon, guide means associated with said vehicle and adapted to provide for vertical relative movement only between said chassis and body, cross members associated with said chassis near its front and rear ends and extending beyond said chassis approximately to the sides of said vehicle body, said cross members having annular openings at or near their ends serving as spring wells to receive and support said pneumatic springs, said springs being adapted to rest firmly and in proper position in said wells, and means for resiliently supporting said body on said pneumatic springs.

JULIAN E. JOHNSON.